(12) United States Patent
Chiu et al.

(10) Patent No.: US 9,754,729 B2
(45) Date of Patent: Sep. 5, 2017

(54) SOLID-STATE ELECTROLYTIC CAPACITOR WITH IMPROVED METALLIC ANODE AND METHOD FOR MANUFACTURING THE SAME

(71) Applicant: APAQ TECHNOLOGY CO., LTD., Miaoli County (TW)

(72) Inventors: Chi-Hao Chiu, Hsinchu (TW); Ming-Tsung Chen, Changhua County (TW); Chai-Ching Sung, Miaoli County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 111 days.

(21) Appl. No.: 14/622,538

(22) Filed: Feb. 13, 2015

(65) Prior Publication Data

US 2016/0118195 A1 Apr. 28, 2016

(30) Foreign Application Priority Data

Oct. 28, 2014 (TW) .............................. 103137176 A

(51) Int. Cl.
| | |
|---|---|
| *H01G 9/04* | (2006.01) |
| *H01G 9/15* | (2006.01) |
| *H01G 9/045* | (2006.01) |
| *H01G 9/048* | (2006.01) |
| *H01G 9/042* | (2006.01) |
| *H01G 9/00* | (2006.01) |
| *H01G 9/052* | (2006.01) |

(52) U.S. Cl.
CPC ............ *H01G 9/048* (2013.01); *H01G 9/0029* (2013.01); *H01G 9/042* (2013.01); *H01G 9/15* (2013.01); *H01G 9/045* (2013.01); *H01G 9/052* (2013.01)

(58) Field of Classification Search
CPC ...... H01G 9/047; H01G 9/0029; H01G 9/242; H01G 9/15; H01G 9/045; H01G 9/052
USPC ....................................................... 361/528
See application file for complete search history.

(56) References Cited

U.S. PATENT DOCUMENTS

| | | | | |
|---|---|---|---|---|
| 2011/0216475 A1* | 9/2011 | Chiu | ...................... | H01G 9/00 361/434 |
| 2012/0275083 A1* | 11/2012 | Yamanaka | ............. | H01G 9/012 361/523 |

* cited by examiner

*Primary Examiner* — Eric Thomas
*Assistant Examiner* — Michael P McFadden
(74) *Attorney, Agent, or Firm* — Li & Cai Intellectual Property (USA) Office

(57) ABSTRACT

The instant disclosure relates to a solid electrolytic capacitor with improved metallic anode and a method for manufacturing the same. The solid electrolytic capacitor includes a substrate layer, a conductive polymer layer and an electrode layer. The substrate layer has a cathode portion and an anode portion having a smaller thickness than the cathode portion. The conductive polymer layer is formed to cover the cathode portion of the substrate layer. The electrode layer is formed to cover the conductive polymer layer. Therefore, the instant solid electrolytic capacitor can be applied to a packing process, and welding success yield rate can be improved.

8 Claims, 5 Drawing Sheets

SOLID-STATE ELECTROLYTIC CAPACITOR WITH IMPROVED METALLIC ANODE AND METHOD FOR MANUFACTURING THE SAME

BACKGROUND OF THE INVENTION

1. Field of the Invention

The instant disclosure relates to a solid-state electrolytic capacitor; in particular, to a solid-state electrolytic capacitor with improved metallic anode, and to a method for manufacturing the same.

2. Description of Related Art

The capacitor is an indispensable element in many electronic products. Various applications of capacitors include home appliances, computer motherboards and peripherals, power supplies, communication products and automobiles. The capacitors such as solid electrolytic capacitors are mainly used to provide filtering, bypassing, rectifying, coupling, blocking or transforming function. With the rapid advancement of semiconductor processing technology, packaged electronic products follows the trend of miniaturization, high electrical performance, multi-function, high reliability, and RoHS Compliance. The wet electrolytic capacitor cannot accommodate the requirements of the electronic products, thus, the solid state electrolytic capacitor is developed.

There are many different types of substrates that can be used for the solid-state electrolytic capacitor. Currently, aluminum and tantalum are the most commonly used materials for solid-state electrolytic capacitors. To increase capacitance, a plurality of solid-state electrolytic capacitors is laminated together in parallel to a form capacitor unit. Thus, a higher capacitance can be obtained, in which total capacitance is the sum of all values from all capacitor units.

Specifically, when stacking the capacitor units in a packaging process, two anode portions of the adjacent capacitor units are welded to each other. However, due to the thick anode portion of each capacitor unit almost always result in low welding quality and low welding success rate. Further, the maximum number of the stacked capacitor units is limited by the thick anode portion of each capacitor unit.

Moreover, in the welding process, molten aluminum can be readily produced and splattered when the thick anode portions of the capacitor units grinded against each other. However, the molten aluminum may occupy only portions of empty space inside the package body after solidification. When the solidifying aluminum is melted twice in a solder reflow process, voids that are form inside the package body can decrease airtightness. Thus, moisture can enter the package body that may affect electric properties of the capacitor units.

SUMMARY OF THE INVENTION

The object of the instant disclosure is to provide a solid-state electrolytic capacitor with improved metallic anode and a method for manufacturing the same. The instant solid-state electrolytic capacitor is configured for use in a stacked-type solid electrolytic capacitor package structure to improve the welding success rate, and to increase the maximum number of the stacked units electrically connected in parallel.

In order to achieve the aforementioned objects, according to an embodiment of the instant disclosure, the solid-state electrolytic capacitor with improved metallic anode by the instant disclosure includes: a substrate layer having an anode part and a cathode part, wherein the anode part has a thinner film thickness than a film thickness of the cathode part; a conductive polymer layer covering on a portion of the cathode part; and an electrode layer covering the conductive polymer layer.

A method for manufacturing the solid-state electrolytic capacitor with improved metallic anode is further provided. According to an embodiment of the instant disclosure, The method comprises:

A method for manufacturing solid-state electrolytic capacitor with improved metallic anode, comprising the following steps: providing a substrate layer having an anode part and a cathode part, wherein the anode part and the cathode part of substrate layer each include a metallic core body and two corrosion layers respectively formed on two opposite surfaces of the metallic core body; removing a portion of the two corrosion layers of the anode part to reduce the film thickness of the anode part to a predetermined thickness thinner than a film thickness of the cathode part; forming a conductive polymer layer on a portion of the cathode part; and forming an electrode layer to cover the conductive polymer layer.

Based on above, the instant solid-state electrolytic capacitor, in which the anode part has a thinner thickness than a thickness of the cathode part, is configured for use in the capacitor package structure to increase the capacitance and reduce the ESR (Equivalent Series Resistance).

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The instant disclosure relates to a novel structural chip-type solid electrolytic capacitor, of which the main technical feature characterized in that the thickness of the capacitor anode is reduced to a predetermined thickness thinner than the thickness of the capacitor cathode by laser stripping or mechanical compacting. Therefore, the chip-type solid electrolytic capacitor can be applied to the solid electrolytic capacitor package structure to increase the welding success rate and reduce ESR. Moreover, the maximum number of the capacitor elements electrically connected in parallel can be increased. Most important of all, the molten metal can be prevented in a capacitor packaging process, so that the solid electrolytic capacitor package structure has the advantages of good air tightness, better reliability.

The First Embodiment

Figure 1:
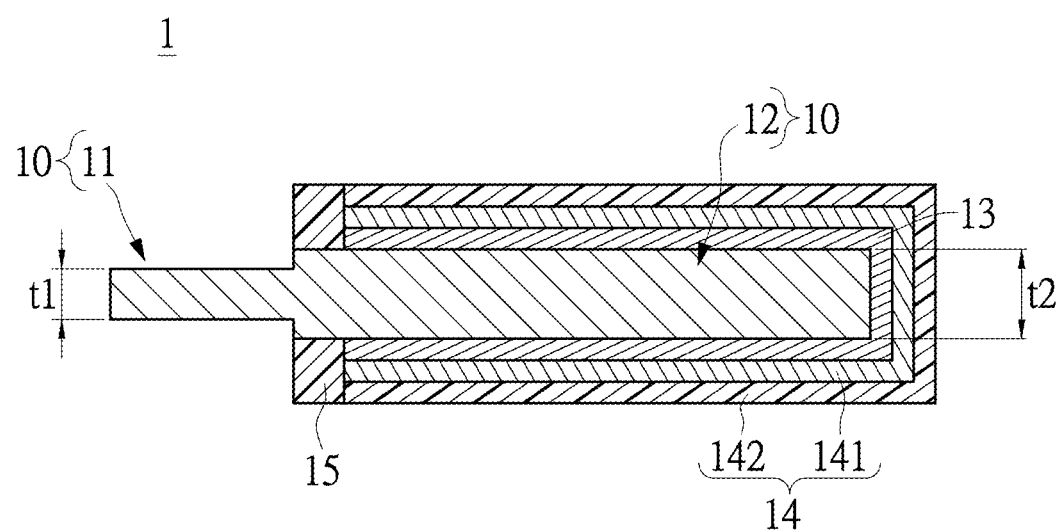
FIG. 1 shows a cross-sectional view of a solid-state electrolytic capacitor with improved metallic anode according to a first embodiment of the instant disclosure.

Please refer to FIG. 1, which shows a cross-sectional view of a solid-state electrolytic capacitor with improved metallic anode in accordance to the first embodiment of the instant disclosure. The solid-state electrolytic capacitor 1 mainly includes a substrate layer 10, a conductive polymer layer 13, and an electrode layer 14. The substrate layer 10 has an anode part 11 and a cathode part 12 separated by an insulating layer 15. The anode part 11 and the cathode parts 12 defining an anode region and a cathode region, respectively, on the solid-state electrolytic capacitor 1. The conductive polymer layer 13 is formed on a portion of the cathode part 12 of the substrate layer 10. The electrode layer 14 is formed to cover the conductive polymer layer 13. Please note that the anode part 11 has a thinner thickness t1 than a thickness t2 of the cathode part 12.

Figure 2:
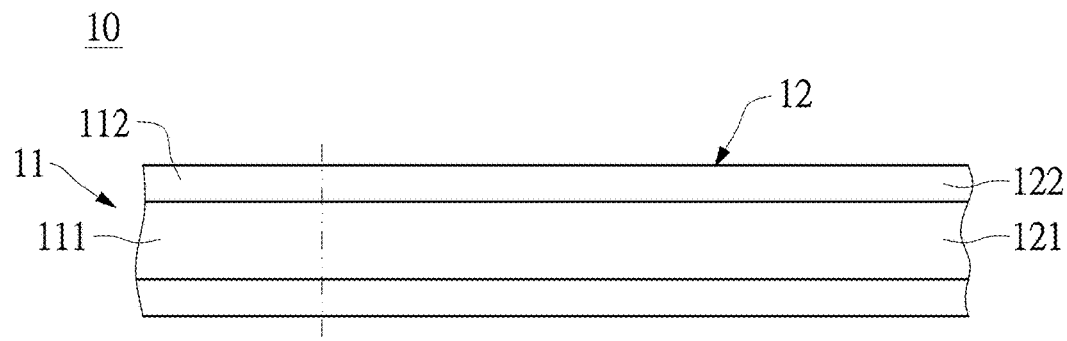
FIG. 2 is a view showing a substrate layer before thinning.
Figure 3:
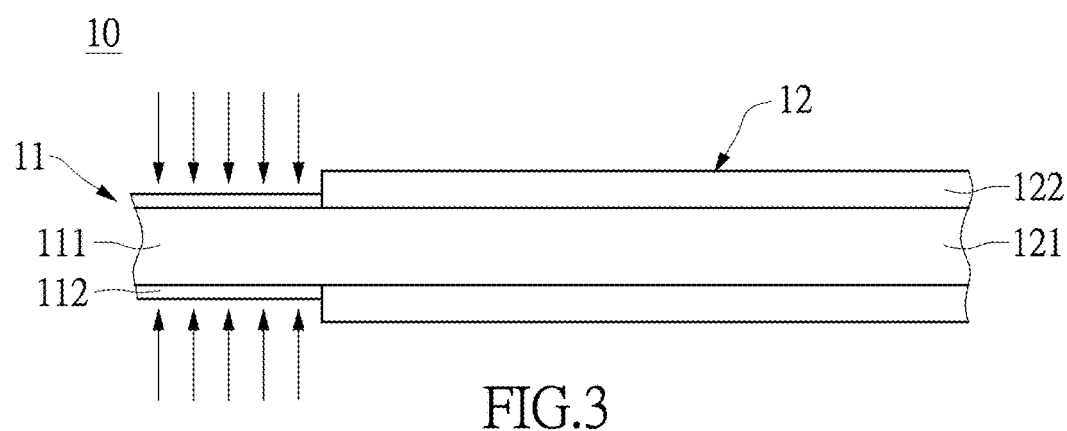
FIG. 3 is a view showing a thinned substrate layer according to the first embodiment of the instant disclosure.

Please refer to FIGS. 2 and 3. To provide further explanation, the anode part 11 of the substrate layer 10 includes a first metallic core body 111 and two first corrosion layers 112 formed on two opposite surfaces of the first metallic core body 111. The cathode part 12 of the substrate layer 10 includes a second metallic core body 121 and two second corrosion layers 122 formed on two opposite surfaces of the first metallic core body 121. The thickness of each second corrosion layer 122 is equal to that of each first corrosion layer 112 before thinning, and the thickness of each second corrosion layer 122 is thinner than that of each first corrosion layer 112 after thinning. For the instant embodiment, the thickness t1 of the anode part 11 ranges from 25 µm to 100 µm, and the thickness t2 of the cathode part 12 ranges from 70 µm to 130 µm. It should be noted that each of the first and second metallic core bodies 111, 112 can be, but not limited to, an aluminum foil body with high aluminum content (>99.8%). In other embodiments, the first and second metallic core bodies 111, 112 can be a sintered tantalum body or a niobium ingot.

Figure 4:
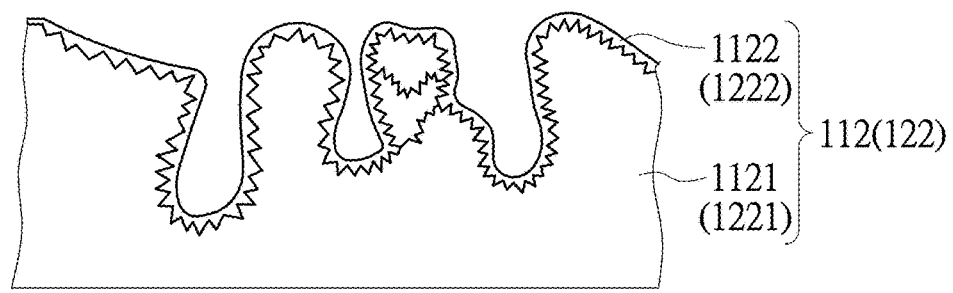
FIG. 4 shows a cross-sectional view of a first or second corrosion layer.

Referring now to FIGS. 2-4, please note that both first and second corrosion layers 112, 122 are consisted of a porous metallic layer 1121(1221) and an oxidation film 1122(1222), but they do not have the same thickness. To provide further explanations, the first corrosion layer 112 is thinned by laser stripping or mechanical compacting, and the thinned first corrosion layer 112 has a thickness less than a predetermined thickness of the second corrosion layer 122. It should be noted that the thinned thickness of the first corrosion layer 112 can be adjusted in accordance with the capacitor performance, which is not limited herein. Accordingly, the solid-state electrolytic capacitor 1 served as a unit that can be applied to a capacitor package structure, thus improving its welding success rate and quality. Besides, the maximum number of the stacked units electrically connected in parallel can be increased (maximum 8 units).

The conductive polymer layer 13 is formed on the surface of the second corrosion layer 122 and configured as a solid electrolyte of the solid-state electrolytic capacitor 1. The conductive polymer layer 13 can be made of polyethylene dioxythiophene (PEDOT), polythiophene (PT), polyacetylene (PA), polyaniline (PANI), or polypyrrole (PPy), where the materials are not restricted thereto. Please note, the above-mentioned conductive polymer materials are all provided with functions of high conductivity, excellent heat resistance and temperature characteristics, strong affinity for adherence to dielectric layer without damaging it, and will not deteriorate under applied voltage. Thus, said materials are suitable to apply on solid-state electrolytic capacitor.

The electrode layer 14 is formed on the surface of the conductive polymer layer 13. The electrode layer 14 is a double-layered electrode consisting of a carbon containing layer 141 and a silver containing layer 142. The carbon containing layer 141 is formed to cover the conductive polymer layer 13. The silver containing layer 142 is formed to cover the carbon containing layer 141.

The Second Embodiment

Figure 5:
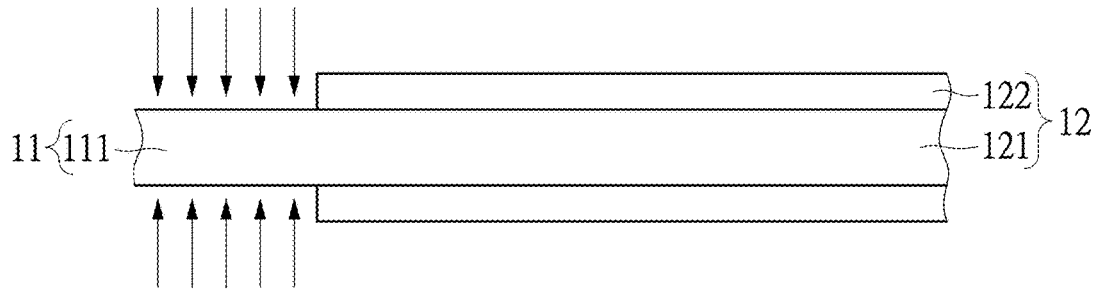
FIG. 5 is a view showing a thinned substrate layer according to a second embodiment of the instant disclosure.

Please refer to FIGS. 1 and 5. For the second embodiment, the anode part 11 of substrate layer 10 consists only of the first metallic core body 111. The cathode part 12 of substrate layer 10 includes a second metallic core body 121 and two second corrosion layers 122 formed on two opposite surfaces of the second metallic core body 121. The difference between the second embodiment and the first embodiment is that the first corrosion layers 112 and a portion of the first metallic core body 111 of the anode part 111 are removed after thinning. Thus, the anode part 11 has a thinner thickness t1 than a thickness t2 of the cathode part 12.

Figure 6:
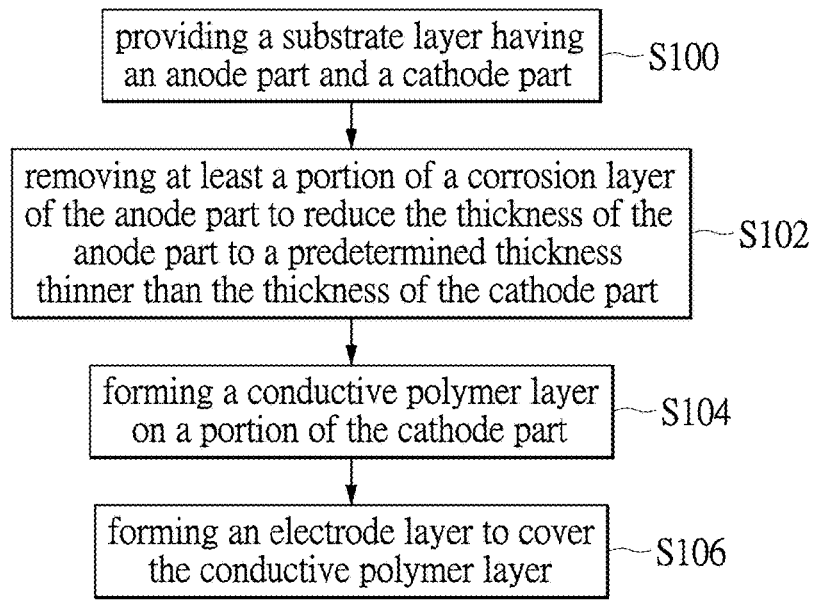
FIG. 6 shows a process flow diagram of a method for manufacturing solid-state electrolytic capacitor with improved metallic anode.

The structural features of the solid-state electrolytic capacitor 1 are mentioned above. Referring now to FIG. 6, the following will describe a method for manufacturing the solid-state electrolytic capacitor 1.

The method firstly provides a substrate layer 10 having an anode part 11 and a cathode part 12 (step S100). Referring back to FIG. 2, the anode part 11 of the substrate layer 10 includes a first metallic core body 111 and two first corrosion layers 112 formed on two opposite surfaces of the first metallic core body 111. The cathode part 12 of the substrate layer 10 includes a second metallic core body 121 and two second corrosion layers 122 formed on two opposite surfaces of the first metallic core body 121.

The step S100 consists of two implementation stages. Referring back to FIG. 3, the anode and cathode parts 11, 12 are etched in the first implementation stage. For the instant embodiment, a chemical corrosion process with no voltage applied or an electrochemical corrosion process with externally applied voltage can be performed on the substrate layer 10. The anode or cathode part 11, 12 includes a porous metallic layer 1121(1221) on the surfaces thereof. The porous metallic layer 1121(1221) is sponge form, so that the effective area of the porous metallic layer can be increased approximately 1.5 to 100 times and in turn increase capacitance. Next, a chemical treatment or an electrochemical treatment is carried out with boric or nitric acid under suitable conditions to form oxidation films 1122, 1222, respectively, on the porous metallic layers 1121, 1221. After that, the preparation of the substrate layer 10 is finished. It should be noted that the porous metallic layers 1121, 1221 can be etched to have various configurations in accordance with the desired capacitance, which is not limited herein.

The method then removes a portion of one or two corrosion layers 112 of the anode part 11 to reduce the film thickness t1 of the anode part 11 to a predetermined thickness thinner than a film thickness t2 of the cathode part 12 (step S102). Referring back to FIG. 3, in practice, at least a portion of the corrosion layers 112 of the anode part 11 can be removed along the thickness direction of the substrate layer 10 by laser stripping. Referring back to FIG. 5, the anode part 11 of the substrate layer 10 can be thinned by another way. Specifically, the corrosion layers 112 of the anode part 11 or the corrosion layers 112 of the anode part 11 and a portion of the first metallic core body 111 in consideration of process requirement or capacitor performance can be completely removed.

Figure 7A:
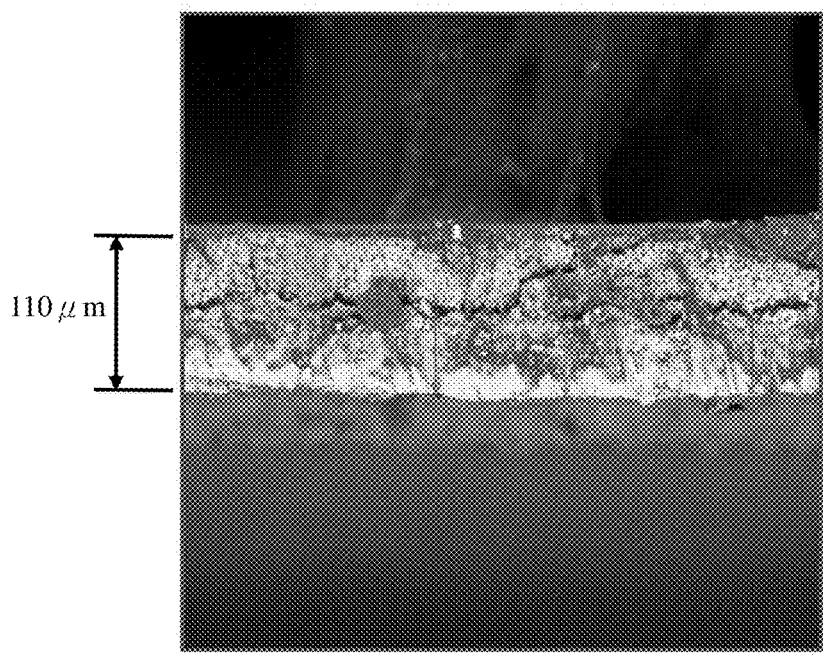
FIGS. 7A and 7B are pictures of an original substrate layer and a thinned substrate layer.
Figure 7B:
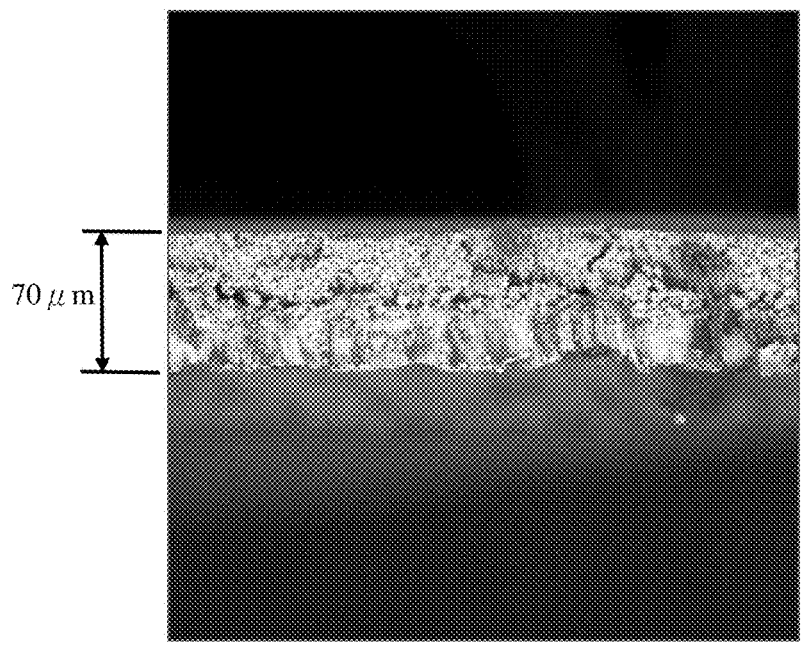
Figure 8:
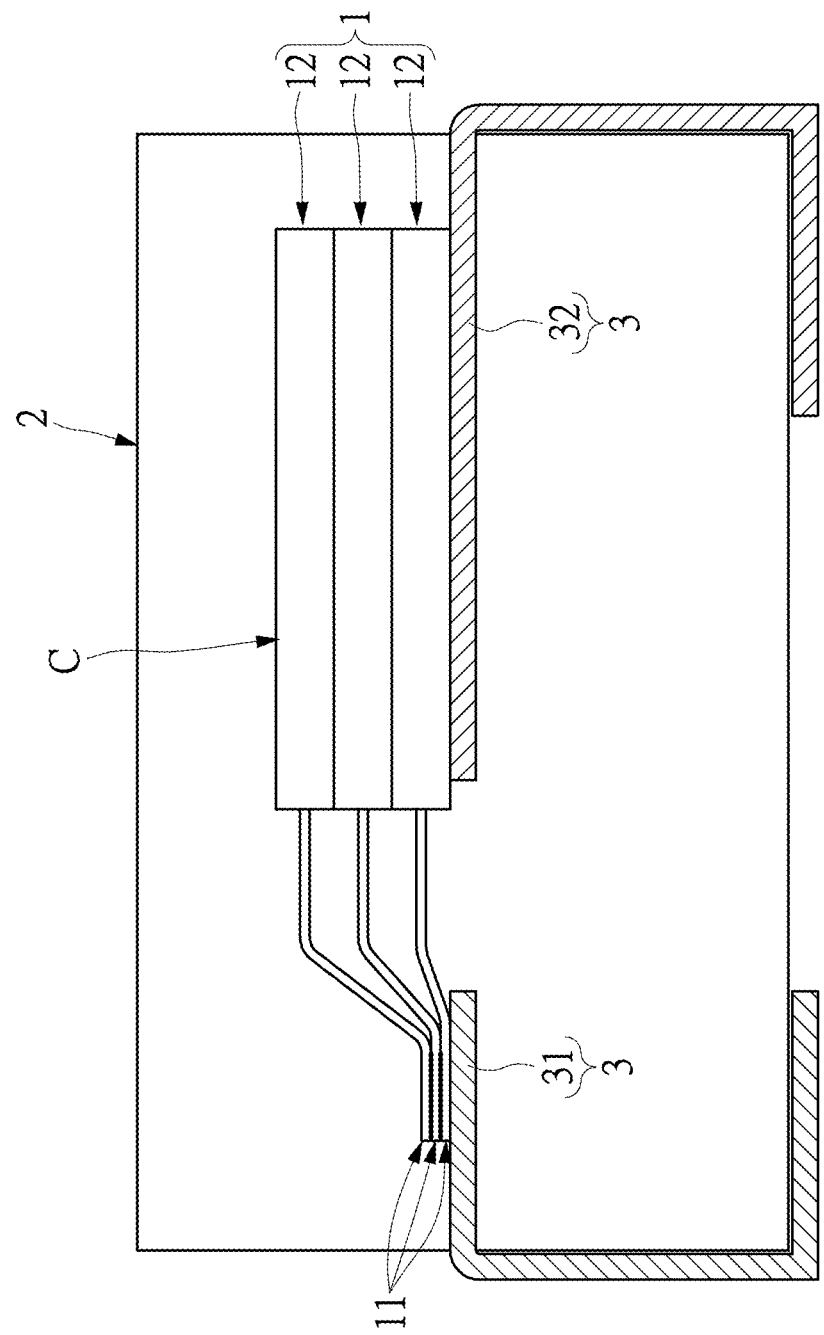
FIG. 8 shows a cross-sectional view of a solid-state electrolytic capacitor package structure.

Please refer to FIGS. 7A and 7B, which are pictures showing the original anode part and the thinned anode part of the substrate layer respectively. The thickness of the original anode part 11, with reference to FIG. 7A is about 110 μm. The thickness of the thinned anode part 11, with reference to FIG. 7B is about 70 μm.

In step S102, at least a portion of the corrosion layers 112 of the anode part 11 can be also compacted by a mechanically compacting device (not shown). With the thinned anode part 11 of the substrate layer 10, the welding success rate and the airtightness of sealed package structure can be improved in a capacitor packaging process. Besides, the capacitor unit can achieve a high mechanical strength without capacitance loss.

Referring back to FIG. 1, the method subsequently includes forming a conductive polymer layer 13 on a portion of the cathode part 12 (step S104), and the method finally includes forming an electrode layer 14 to cover the conductive polymer layer 13 (step S106). The solid-state electrolytic capacitor 1 is obtained after going through step S100 to step S106.

Please refer to FIG. 7, which shows a cross-sectional view of a solid-state electrolytic capacitor package structure applied with the above-mentioned solid-state electrolytic capacitor 1. The solid-state electrolytic capacitor package structure includes a capacitor module C, a package body 2, and a lead frame 3. The capacitor module C consists of a plurality of solid-state electrolytic capacitors 1 served as capacitor units and sequentially stacked together in parallel connection. Specifically, the cathode parts 12 of any two adjacent capacitor units are electrically connected by the electrode layers 14. The anode parts 11 of any two adjacent capacitor units are connected together by a welding layer (not shown). It should be noted that the solid-state electrolytic capacitor 1 can be applied to the capacitor package structure to improve its reliability and the airtightness.

The package body 2 comprises at least a non-transparent package material (e.g. epoxy or silicone), formed to cover the capacitor module C. The lead frame 3 includes a first conductive terminal 31 and a second conductive terminal 32 separated from each other. Specifically, one end of the first conductive terminal 31 is electrically connected to the lower-most anode part 11 of the solid-state electrolytic capacitor 1, and the other end of the first conductive terminal 31 extends outside the package body 2. One end of the second conductive terminal 32 is electrically connected to the lower-most cathode part 12 of the solid-state electrolytic capacitor 1, and the other end of the second conductive terminal 32 extends outside the package body 2.

In summary, the instant solid-state electrolytic capacitor, in which the anode part has a thinner thickness than a thickness of the cathode part, can be applied to the capacitor package structure to increase capacitance and reduce ESR. Moreover, the maximum number of the stacked units electrically connected in parallel can be increased. Most important of all, the molten metal can be prevented in a capacitor packaging process, so that the capacitor package structure using the same has the advantages of good air tightness, better reliability, and the welding success rate can be improved.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A solid-state electrolytic capacitor with improved metallic anode, comprising:
   a substrate layer having an anode part and a cathode part, wherein the anode part and the cathode part each includes a metallic core body and two corrosion layers respectively formed on two opposite surfaces of the metallic core body, and each corrosion layer of the anode part has a thinner thickness than a thickness of each corrosion layer of the cathode part, and thus the thickness of the anode part is smaller than that of the cathode part;
   a conductive polymer layer covering on a portion of the cathode part; and
   an electrode layer covering the conductive polymer layer.

2. The solid-state electrolytic capacitor with improved metallic anode according to claim 1, wherein the metallic core body of the anode part is a sintered tantalum body, an aluminum foil, or a niobium ingot.

3. The solid-state electrolytic capacitor with improved metallic anode according to claim 2, wherein the metallic core body of the cathode part is a sintered tantalum body, an aluminum foil, or a niobium ingot.

4. The solid-state electrolytic capacitor with improved metallic anode according to claim 1, wherein the electrode layer includes a carbon layer covering the conductive polymer layer and a silver layer covering the carbon layer.

5. A method for manufacturing solid-state electrolytic capacitor with improved metallic anode, comprising the following steps:
   providing a substrate layer having an anode part and a cathode part, wherein the anode part and the cathode part of substrate layer each include a metallic core body and two corrosion layers respectively formed on two opposite surfaces of the metallic core body;
   removing a portion of the two corrosion layers of the anode part to reduce the film thickness of the anode part to a predetermined thickness thinner than a film thickness of the cathode part;
   forming a conductive polymer layer on a portion of the cathode part; and
   forming an electrode layer to cover the conductive polymer layer.

6. The method for manufacturing solid-state electrolytic capacitor with improved metallic anode according to claim 5, wherein at least a portion of the corrosion layers of the anode part is removed along the thickness direction of the substrate layer by laser stripping.

7. The method for manufacturing solid-state electrolytic capacitor with improved metallic anode according to claim 6 wherein the corrosion layers and a portion of the metallic core body of the anode part are removed along the thickness direction of the substrate layer by laser stripping.

8. The method for manufacturing solid-state electrolytic capacitor with improved metallic anode according to claim 5, wherein the corrosion layers of the anode part are compacted along the thickness direction of the substrate layer by a mechanically compacting device.

\* \* \* \* \*